United States Patent
Kamata et al.

(10) Patent No.: US 12,410,858 B2
(45) Date of Patent: Sep. 9, 2025

(54) GEAR MECHANISM AND METHOD FOR MANUFACTURING GEAR MECHANISM

(71) Applicant: JATCO Ltd, Fuji (JP)

(72) Inventors: Daiki Kamata, Isehara (JP); Kouji Matsuo, Hadano (JP); Ryouhei Saitou, Yokohama (JP); Kunihiko Fukanoki, Atsugi (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 17/374,129

(22) Filed: Jul. 13, 2021

(65) Prior Publication Data

US 2022/0065341 A1 Mar. 3, 2022

(30) Foreign Application Priority Data

Aug. 26, 2020 (JP) .................... 2020-142351

(51) Int. Cl.
| | | |
|---|---|---|
| *F16H 55/00* | (2006.01) | |
| *F16H 1/06* | (2006.01) | |
| *F16H 55/08* | (2006.01) | |
| *F16H 55/17* | (2006.01) | |

(52) U.S. Cl.
CPC ............... *F16H 55/08* (2013.01); *F16H 1/06* (2013.01); *F16H 55/17* (2013.01)

(58) Field of Classification Search
CPC . F16H 55/08; F16H 1/16; F16H 55/17; F16H 2055/086; F16H 2055/0866; F16H 55/0806; F16H 7/023; F16H 2025/2028
See application file for complete search history.

(56) References Cited

U.S. PATENT DOCUMENTS

| | | | | |
|---|---|---|---|---|
| 6,837,123 | B2 * | 1/2005 | Hawkins | ................ F16H 55/08 74/462 |
| 2002/0134184 | A1 * | 9/2002 | Hawkins | ................ F16H 55/08 74/462 |
| 2008/0081719 | A1 * | 4/2008 | Young | ....................... F16H 7/06 474/152 |
| 2012/0003058 | A1 | 1/2012 | Hutter et al. | |
| 2017/0021406 | A1 * | 1/2017 | Hofmann | ................ F16H 55/17 |

FOREIGN PATENT DOCUMENTS

| | | | | |
|---|---|---|---|---|
| CN | 102256735 A | 11/2011 | | |
| JP | 2013-200015 A | 10/2013 | | |
| WO | WO-2016197905 A1 | * 12/2016 | | ................ B23F 5/20 |
| WO | WO-2016197909 | * 12/2016 | | ................ B23F 5/20 |

* cited by examiner

*Primary Examiner* — Zakaria Elahmadi
(74) *Attorney, Agent, or Firm* — Foley & Lardner LLP

(57) ABSTRACT

The gear mechanism includes a gear shaped to have a bottom land, a first tooth flank connected to the bottom land, a second tooth flank connected to the bottom land, a first tooth face connected to the first tooth flank, and a second tooth face connected to the second tooth flank. The bottom land is curved, a radius of curvature of the first tooth flank is greater than a radius of curvature of the second tooth flank, and parts of the first tooth flank and the second tooth flank connected to connection points with the bottom land are curved such that a distance of each of the parts from a shaft center of the gear decreases toward the connection points and that a gradient of each of the parts decreases toward the connection points.

2 Claims, 8 Drawing Sheets

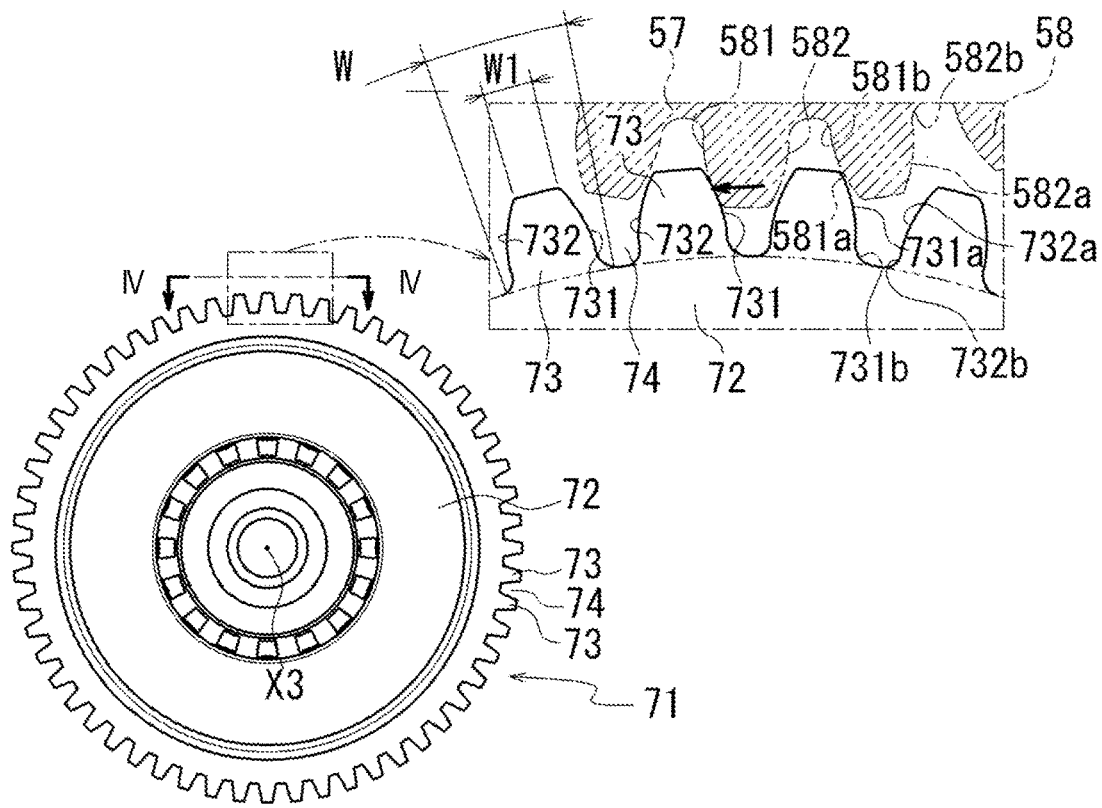
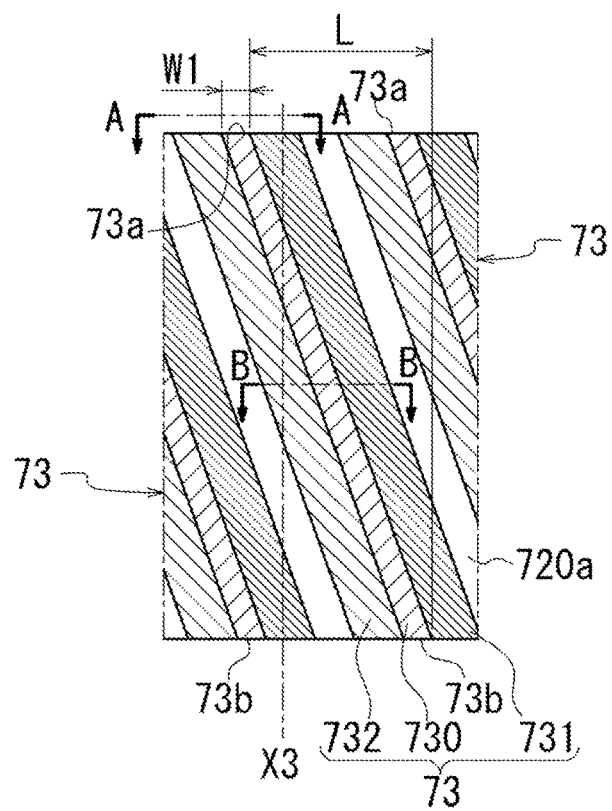
FIG.3
FIG.4

GEAR MECHANISM AND METHOD FOR MANUFACTURING GEAR MECHANISM

TECHNICAL FIELD

The present invention relates to a gear mechanism.

BACKGROUND ART

JP2013-200015A discloses a helical parallel gear used for a transmission.

In order to improve strength of a tooth flank of a gear, it is preferable to mitigate stress concentration. For that purpose, it is preferable to make a radius of curvature of the tooth flank greater and mitigate the stress concentration to the tooth flank.

SUMMARY OF INVENTION

When the radius of curvature of the tooth flank is simply made greater in order to improve the strength of the toot flank, the region of tooth flank of one of the adjacent two teeth crosses with the region of tooth flank of the other one and it sometimes creates a sharp edge at the boundary region between the two adjacent teeth. When a sharp edge is formed on the surface of the gear, stress concentration occurs there. Thus, it is desired to mitigate the stress concentration.

Therefore, it is desired to provide a gear having a shape balanced with respect to the required functions, including a viewpoint of strength improvement, for the gear.

According to an aspect of the present invention, a gear mechanism is provided. The gear mechanism includes a gear shaped to have a bottom land, a first tooth flank connected to the bottom land, a second tooth flank connected to the bottom land, a first tooth face connected to the first tooth flank, and a second tooth face connected to the second tooth flank. The bottom land is curved, a radius of curvature of the first tooth flank is greater than a radius of curvature of the second tooth flank, and parts of the first tooth flank and the second tooth flank connected to connection points with the bottom land are curved such that a distance of each of the parts from a shaft center of the gear decreases toward the connection points and that a gradient of each of the parts decreases toward the connection points.

According to one aspect of the present invention, it is possible to provide a gear mechanism that includes a gear having a shape balanced with respect to required functions.

BRIEF DESCRIPTION OF DRAWINGS

FIG. 3 is a plan view of the counter gear 7 viewed from the side of the large-diameter gear 71.

FIG. 4 is a partial enlarged view of the outer periphery of the large-diameter gear 71 viewed from IV-IV arrow direction in FIG. 3.

EMBODIMENTS

Figure 1:
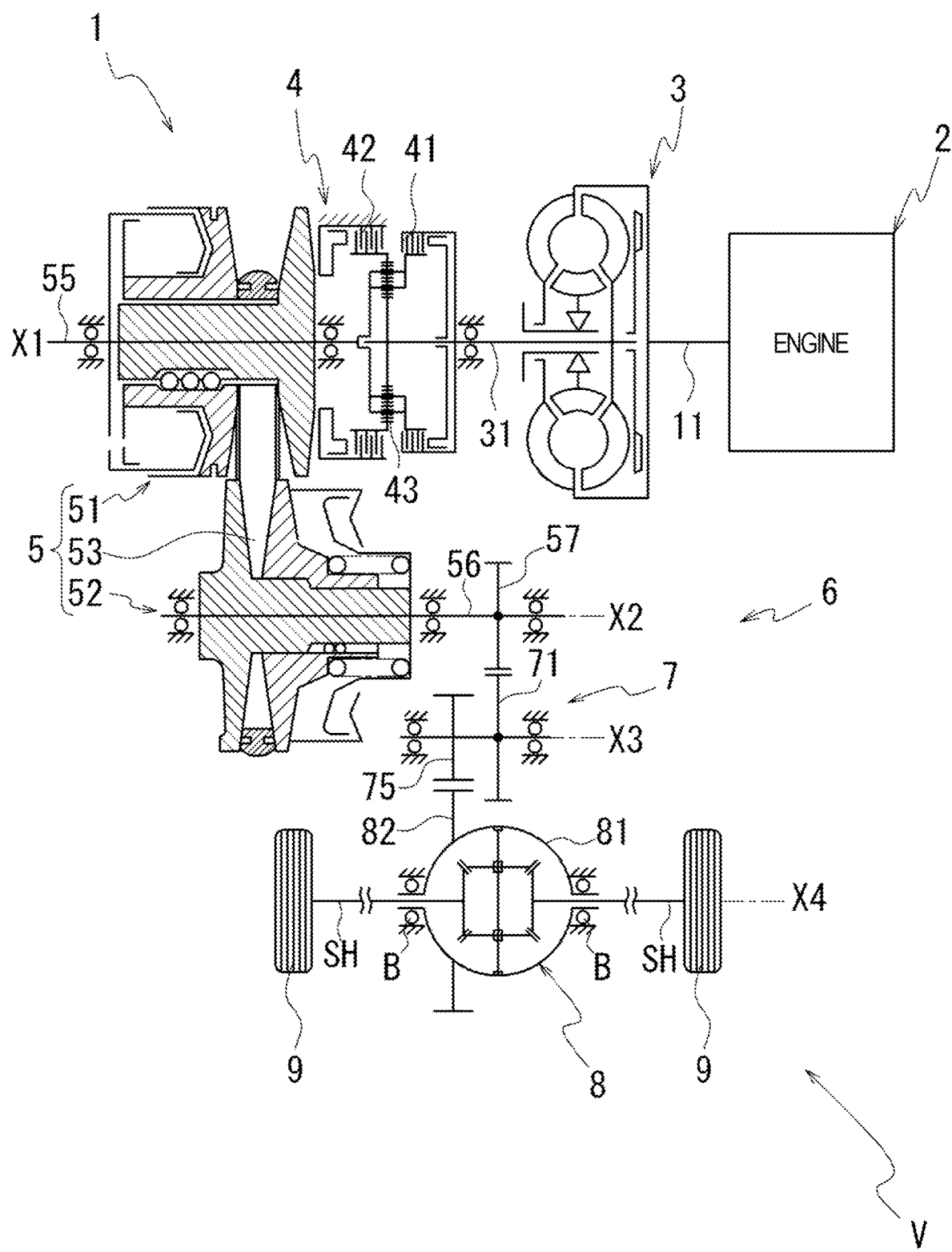
FIG. 1 is a schematic view of a vehicle V equipped with a belt-type continuous variable transmission 1 for vehicle.

Hereinafter, an embodiment of the present invention will be described referring to an example in which the embodiment is adopted to a counter gear 7 of a final reduction mechanism 6 of the continuous variable transmission 1. FIG. 1 is a schematic view of a vehicle V equipped with a belt-type continuous variable transmission 1 for vehicle.

As illustrated in FIG. 1, a drive system of the vehicle V comprises an engine 2, a torque converter 3, a forward/reverse switching device 4, a variator (transmission mechanism), the final reduction mechanism 6 (gear mechanism), and drive wheels 9, 9.

The torque converter 3 is a fluid transmission device having a torque increase function. The rotation (rotational driving force) input from the engine 2 to the torque converter 3 is transmitted to the forward/reverse switching device 4 side through the output shaft 31.

The forward/reverse switching device 4 has a forward clutch 41, a reverse brake 42 and a planetary gear mechanism 43. At the forward/reverse switching device 4, when the forward clutch 41 is engaged, the rotation input from the torque converter 3 side is output to the variator 5 in a forward rotation. When the reverse brake 42 is engaged, the rotation input from the torque converter 3 side is output to the variator 5 in a reverse rotation.

The variator 5 has a primary pulley 51 which rotates around the input shaft 55 (rotational axis X1), a secondary pulley 52 which rotates around the output shaft 56 (rotational axis X2) and a belt 53. The belt 53 is wrapped around a pair of the pulleys (the primary pulley 51 and the secondary pulley 52).

At the variator 5, the rotation input from the forward/reverse switching device 4 side is shifted at a desired speed ratio and output to the final reduction mechanism 6 side, by changing the wrapping radius of the belt 53 around the primary pulley 51 and the secondary pulley 52.

The final reduction mechanism 6 has a counter gear 7 and a differential device 8. The counter gear 7 has a large-diameter gear 71 and a small-diameter gear 75. The counter gear 7 is rotatable around the rotational axis X3. The large-diameter gear 71 meshes rotation-transmittably with the output gear 57 provided to the output shaft 56 of the variator 5. The small-diameter gear 75 meshes rotation-transmittably with the final gear 82.

The final gear 82 is fixed to the differential case 81 of the differential device 8. The rotation of the output shaft 56 of the variator 5 is transmitted to the differential case 81 through the counter gear 7. The rotation transmitted to the differential case 81 is finally transmitted to the drive wheels 9, 9 through the drive shafts SH, SH which rotate integrally with the differential case 81.

In the continuous variable transmission 1, a plurality of gear mechanisms (planetary gear mechanism 43, final reduction mechanism 6) are arranged on the transmission path of the output rotation (rotational driving force) of the engine 2. The counter gear 7 of the final reduction mechanism 6 is one of the gears composing the gear mechanism.

Figure 2:
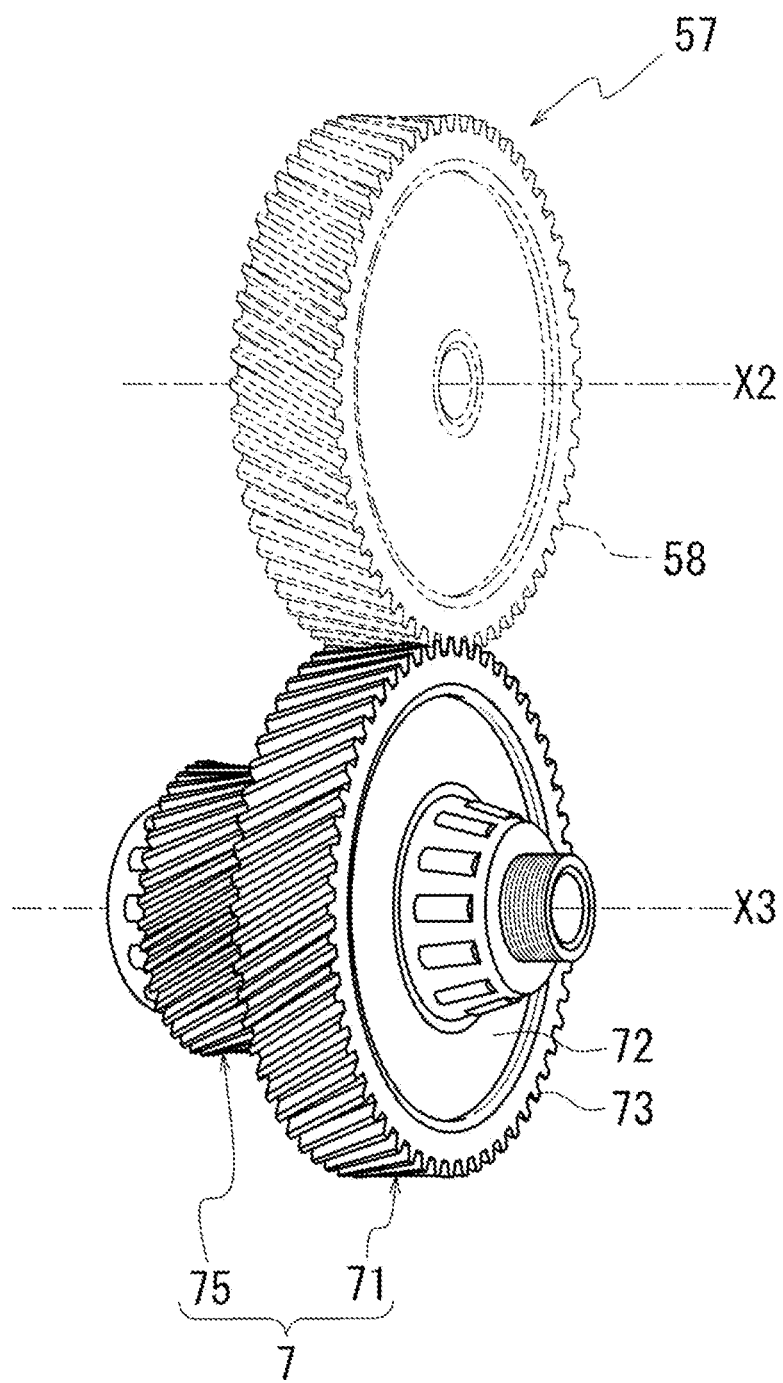
FIG. 2 is a perspective view of a counter gear 7 viewed from the side of a large-diameter gear 71.

FIG. 2 is a perspective view of the counter gear 7 viewed from the side of the large-diameter gear 71. In FIG. 2, the output gear 57 meshing with the outer periphery of the large-diameter gear 71 is illustrated with a virtual line. FIG. 3. is a plan view of the counter gear 7 viewed from the side of the large-diameter gear 71. FIG. 4 is a partial enlarged view of the outer periphery of the large-diameter gear 71 viewed from IV-IV arrow direction in FIG. 3. In FIG. 4, the tooth tips 730, the first side surfaces 731 and the second side surfaces 732 are hatched for easy understanding of the position of the tooth portions 73 of the outer periphery of the large-diameter gear 71.

As illustrated in FIG. 2, the large-diameter gear 71 and the small-diameter gear 75 are arranged concentrically about a common axle (rotational axis X3) in the counter gear 7. As illustrated in FIG. 3, in the large-diameter gear 71, the tooth portions 73 are provided on the outer periphery of the disc-shaped base portion 72.

The tooth portions 73 are provided over the entire circumference in the circumferential direction around the rotational axis X3 on the outer periphery of the base portion 72. The tooth portions 73 are provided at predetermined intervals in the circumferential direction around the rotational axis X3. The space between the tooth potions 73, 73 adjacent in the circumferential direction is a tooth space 74 at which the tooth portion of the mating gear can be engaged. In the present embodiment, the output gear 57 provided to the output shaft 56 of the variator 5 is the mating gear. The tooth portions 58 on the outer periphery of the output gear 57 are inserted to the tooth spaces 74, and thereby the output gear 57 and the large-diameter gear 71 are meshed with each other. The large-diameter gear 71 and the output gear 57 are a pair of gears.

As illustrated in FIG. 4, each of the tooth portions 73 is provided in an orientation crossing the rotational axis X3 when viewed from a radial direction of the rotational axis X3. Each of the tooth portions 73 extends in the direction of the rotational axis X3. One end 73a and the other end 73b of the tooth portion 73 are offset with a predetermined length L in the circumferential direction around the rotational axis X3. The tooth tip 730 on the tip end of the tooth portion 73 is formed with a width W1 that is substantially uniform over the entire length along the rotational axis X3.

As illustrated in FIG. 3, each of the tooth portions 73 projects outwardly from the outer periphery of the base portion 72 when viewed in the direction of the rotational axis X3. Each of the tooth portions 73 has a cross-sectional shape, the width W of which in the circumferential direction becomes narrower toward the outer radius side. The first side surface 731 at one side of the tooth portion 73 and the second side surface 732 at the other side of the tooth portion 73 in the circumferential direction around the rotational axis X3 have curved surfaces. The cross-sectional shape of the tooth portion 73 is uniform over the entire length along the direction of the rotational axis X3, and the shapes of the tooth portions 73 at the side surface along the A-A line and at the cross section along the B-B line are the same with the one of the tooth portion 73 illustrated in FIG. 3.

In the present embodiment, the first side surface 731 is a side surface of a drive-side and the second side surface 732 is a side surface of a coast-side. The side surface of the drive-side refers to a side surface which is involved with a transmission of a rotational driving force input from the side of the engine 2. The side surface of the coast-side refers to a side surface which is involved with a transmission of a rotational driving force input from the side of drive wheels 9, 9.

For instance, rotational driving force is input from the output gear 57 at the side of the variator 5 to the counter gear 7 when the vehicle V equipped with the continuous variable transmission 1 is running with rotational driving force of the engine 2. In the present embodiment, at this moment, the first side surface 581 of the tooth portion 58 of the output gear 57 contacts with the first side surface 731 of the tooth portion 73 (see FIG. 3). Accordingly, the output rotation of the variator 5 is input to the large-diameter gear 71 through the first side surface 731 of the tooth portion 73, thereby rotating the counter gear 7 around the rotational axis X3.

For instance, the counter gear 7 rotates by the rotational driving force input from the drive wheels 9, 9 when the vehicle V equipped with the continuous variable transmission 1 is running a coast running with zero (=0) accelerator position (accelerator opening degree). At this moment, the second side surface 732 of the tooth portion 73 contacts with the second side surface 582 of the tooth portion 58 of the output gear 57. Accordingly, the rotational driving force input from the drive wheels 9, 9 is input to the output gear 57 of the variator 5 side through the second side surface 732 of the tooth portion 73, thereby rotating the output shaft 56 around the rotational axis X2.

Figure 5:
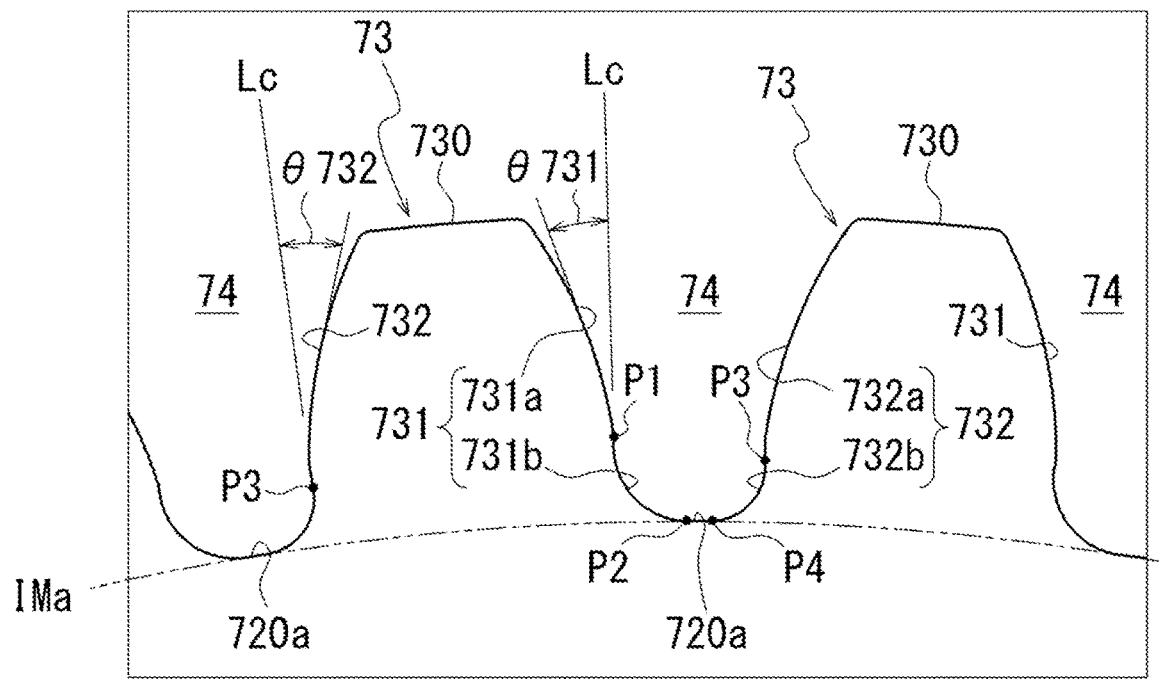
FIG. 5 is a drawing for explaining shapes of a first side surface 731 and a second side surface 732 of a tooth portion 73 on the outer periphery of the large-diameter gear 71.
Figure 6:
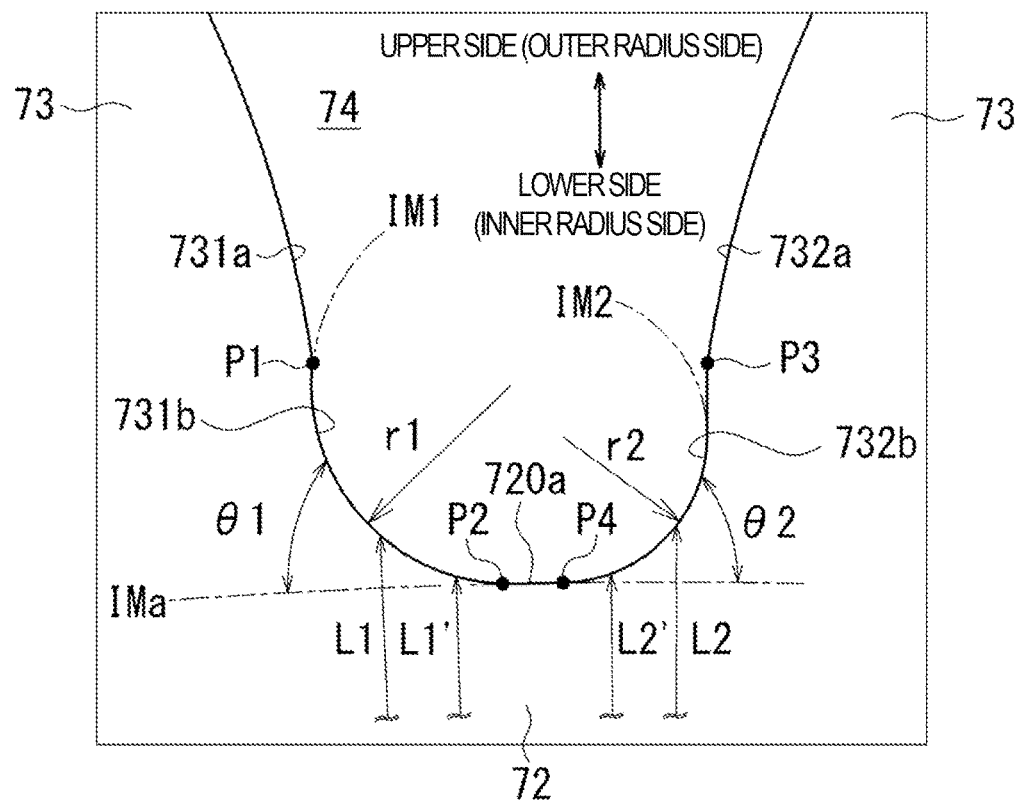
FIG. 6 is an enlarged view of a bottom land 720a side between two adjacent tooth portions 73, 73.

FIG. 5 is a drawing for explaining the shapes of the first side surface 731 and the second side surface 732 of the tooth portion 73 on the outer periphery of the large-diameter gear 71. FIG. 5 illustrates the first side surface 731 and the second side surface 732 between two tooth portions 73, 73 adjacent in a circumferential direction. FIG. 6 is an enlarged view of the bottom land 720a side between two adjacent tooth portions 73, 73, for explaining the shapes of the first tooth flank 731b on the first side surface 731, the second tooth flank 732b on the second side surface 732, and the bottom land 720a.

As illustrated in FIG. 5, in the first side surface 731 of the tooth portion 73, the region adjacent to the tooth tip 730 is the first tooth face 731a. In the first side surface 731 of the tooth portion 73, the region adjacent to the first tooth face 731a is the first tooth flank 731b. The first tooth face 731a has a curved cross-sectional shape. In a cross-sectional view, the first tooth face 731a is shaped in a curve inflating toward the side of other tooth potion 73 adjacent across the tooth space 74. As illustrated in FIG. 6, the first tooth flank 731b has a curved cross-sectional shape. In a cross-sectional view, the first tooth flank 731b is shaped in a curve recessed in a direction away from the adjacent other tooth portion 73. The first tooth flank 731b of the tooth portion 73 is recessed toward inner radius side (lower side in a direction approaching the rotational axis X3 side) of the large-diameter gear 71, forming an arc along the virtual circle IM1.

The first tooth face 731a and the first tooth flank 731b are continuously connected not to form an edge at a connection point P1 between the first tooth face 731a and the first tooth flank 731b. The inner radius side of the first tooth flank 731b is continuously connected to the bottom land 720a not to form an edge at a connection point P2 between the first tooth flank 731b and the bottom land 720a.

The bottom land 720a has an arc-like cross-sectional shape. In cross-sectional view, the bottom land 720a is shaped in a curve inflating toward outer radius side of the large-diameter gear 71 (upper side in a direction away from the rotational axis X3). When viewed from the direction of the rotational axis X3 (axial center direction) of the large-diameter gear 71, the bottom land 720a forms an arc along a virtual circle IMa centered around the rotational axis X3. The bottom land 720a is shaped in an upward convex curve (outer radius side).

As illustrated in FIG. 5, in the second side surface 732 of the tooth portion 73, the region adjacent to the tooth tip 730 is the second tooth face 732a. In the second side surface 732 of the tooth portion 73, the region adjacent to the second tooth face 732a is the second tooth flank 732b. The second tooth face 732a has a curved cross-sectional shape. In a cross-sectional view, the second tooth face 732a is shaped in a curve inflating toward the side of other tooth potion 73 adjacent across the tooth space 74. As illustrated in FIG. 6, the second tooth flank 732b has a curved cross-sectional shape. In a cross-sectional view, the second tooth flank 732b is shaped in a curve recessed in a direction away from the adjacent other tooth portion 73. The second tooth flank 732b of the tooth portion 73 is recessed toward an inner radius side of the large-diameter gear 71 (lower side in a direction approaching the rotational axis X3 side), forming an arc along the virtual circle IM2.

The second tooth face 732a and the second tooth flank 732b are continuously connected not to form an edge at a connection point P3 between the second tooth face 732a and the second tooth flank 732b. The inner radius side of the second tooth flank 732b is continuously connected to the bottom land 720a not to form an edge at a connection point P4 between the second tooth flank 732b and the bottom land 720a.

Here, it is preferable to mitigate a stress concentration at the tooth flank side in order for improving the strength of the tooth flanks of the tooth portion 73 of the large-diameter gear 71 (the first tooth flank 731b, the second tooth flank 732b). As one exemplary way to mitigate stress concentration, it is one idea to increase a radius of curvature of the tooth flanks (the first tooth flank 731b, the second tooth flank 732b).

When the radius of curvature of the tooth flank is simply made greater in order to improve the strength of the toot flank, the region of tooth flank of one of the adjacent two teeth crosses with the region of tooth flank of the other one and it sometimes creates a sharp edge E at the boundary region between the two adjacent teeth.

Figure 7:
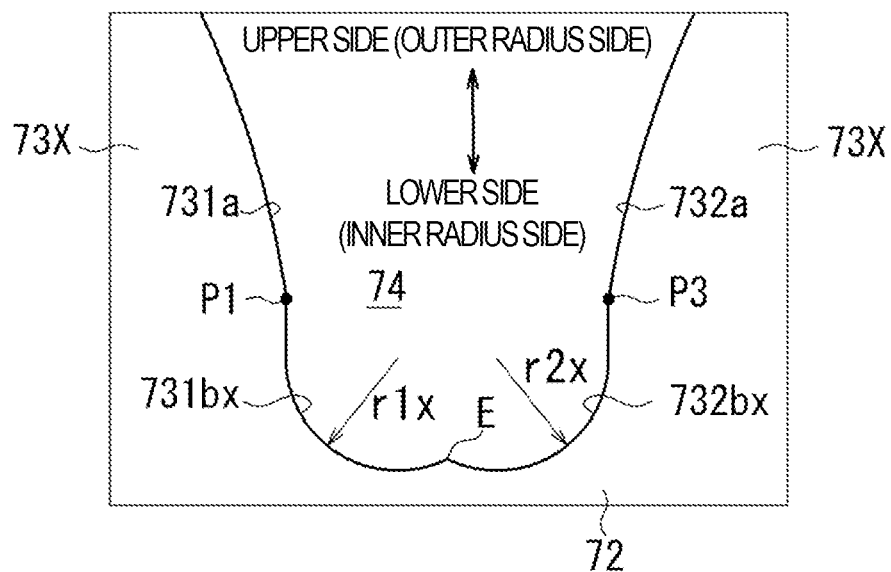
FIG. 7 is a drawing for explaining the edge E formed near the tooth flanks.

For example, in the case of FIG. 7, the radius of curvature r1x of the first tooth flank 731bx and the radius of curvature r2x of the second tooth flank 732bx is same (r1x=r2x). Thus, an edge E protruding upwardly is formed at the point of intersection between the first tooth flank 731bx and the second tooth flank 732bx.

Figure 8:
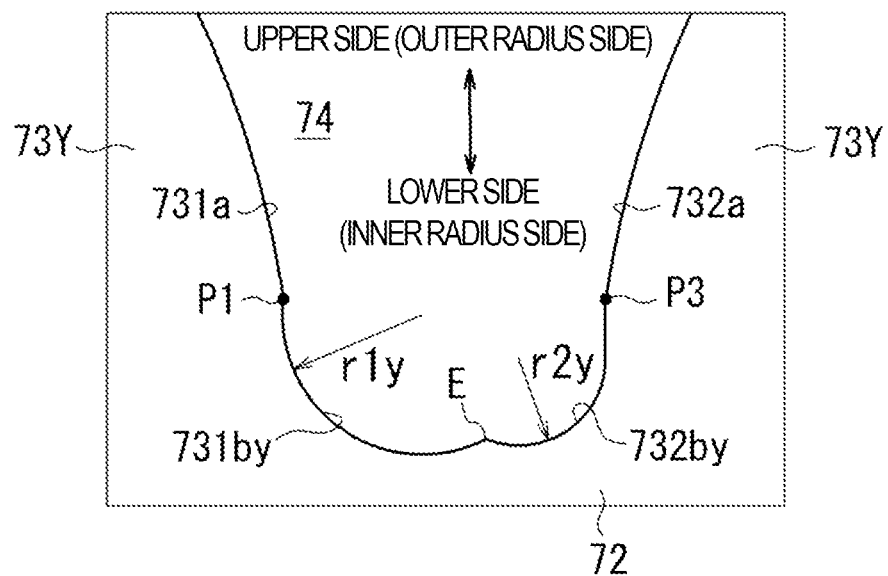
FIG. 8 is a drawing for explaining the edge E formed near the tooth flanks.

For example, in the case of FIG. 8, the radius of curvature r1y of the first tooth flank 731by is greater than the radius of curvature r2y of the second tooth flank 732by (r1y>r2y). Thus, an edge E protruding upwardly is formed at the point of intersection between the first tooth flank 731by and the second tooth flank 732by.

Figure 9:
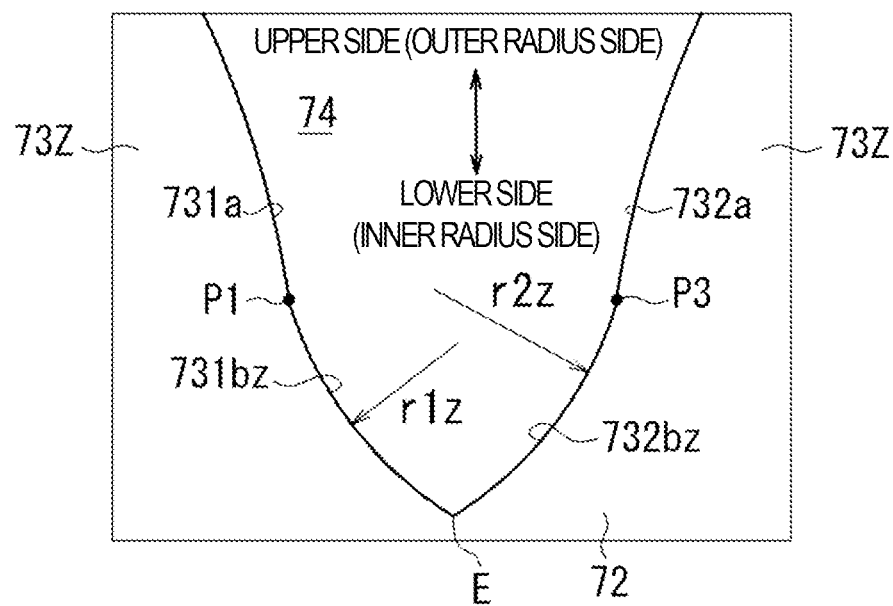
FIG. 9 is a drawing for explaining the edge E formed near the tooth flanks.

For example, in the case of FIG. 9, the radius of curvature r1z of the first tooth flank 731bz and the radius of curvature r2z of the second tooth flank 732bz is substantially same (r1z≈r2z). Thus, an edge E recessing sharply downward is formed at the point of intersection between the first tooth flank 731bz and the second tooth flank 732bz.

As shown here, when the edge E is formed at the intersection between the first tooth flank 731bx, 731by, 731bz and the second tooth flank 732bx, 732by, 732bz at the tooth portions 73X, 73Y, 73Z of the large-diameter gear 71, a stress concentration occurs at the edge E and its vicinity area.

Therefore, in the present embodiment, the radius of curvature r1 of the first tooth flank 731b and the radius of curvature r2 of the second tooth flank 732b are determined such that the bottom land 720a remains between the first tooth flank 731b and the second tooth flank 732b as illustrated in FIG. 6. Accordingly, the present embodiment is able to mitigate the stress concentration to the first tooth flank 731b and the second tooth flank 732b.

In addition, in the present embodiment, the bottom land 720a is shaped in curve in order to mitigate the stress concentration to the bottom land 720a. In particular, the bottom land 720a is formed along the virtual circle IMa which is along the outer periphery of the base portion 72 of the large-diameter gear 71, having a curved shape projecting upward (toward outer radius side).

There is a possibility where no bottom land 720a remains if both of the radiuses of curvature r1 and r2 of the first tooth flank 731b and the second tooth flank 732b are made greater in a same manner. On the other hand, it may be an idea to enlarge the large-diameter gear 71 (gear) for enabling the bottom land 720a to remain; however, in that case, it would become an obstacle for downsizing of a gear. By differentiating the radius of curvature r1 of the first tooth flank 731b and the radius of curvature r2 of the second tooth flank 732b, it is possible to design a gear taking into account a balance of mitigation of a stress concentration to the tooth flanks (first tooth flank 731b, second tooth flank 732b), bottom land reserving, and gear downsizing. This is a gear design standing on a finding that function requirements for the first tooth flank 731b and the second tooth flank 732b are not necessarily equivalent.

In the present embodiment, the radius of curvature r1 of the first flank 731b of the first side surface 731 which is the side surface of the drive side of the tooth portion 73 is made greater than the radius of curvature r2 of the second tooth flank 732b of the second side surface 732 which is the side surface of the coast side of the tooth portion 73 (r1>r2). According to this, it is possible to appropriately mitigate a stress concentration to the tooth flank during forward running of the vehicle V equipped with the continuous variable transmission 1. Therefore, improved durability of the tooth portion 73 can be expected while formation of an edge E due to increased radius of curvature is avoided.

In addition, if the tooth flanks (first tooth flank 731b, second tooth flank 732b) are shaped to scoop in the inner radius direction at the vicinity of the connection points P2, P4 with the bottom land 720a, the stress easily concentrates onto the vicinity of the connection points P2, P4. In the present embodiment, therefore, a gear design is adopted in which the distances L1, L2 from the shaft center (the center of the large-diameter gear 71 (rotational axis X3)) decreases toward the connection points P2, P4 with the bottom land 720a. In the case of FIG. 6, the distance L1 between the first tooth flank 731b and the shaft center decreases as the first tooth flank 731b approaches the connection point P2 (see L1→L1' in the figure). The distance L2 between the second tooth flank 732b and the shaft center decreases as the second tooth flank 732b approaches the connection point P4 (see L2→L2' in the figure).

By adopting such a gear design, the tooth flanks (first tooth flank 731b, second toot flank 732b) are kept from being shaped to scoop in the inner radius direction (lower side) in the vicinity of connection points P2, P4 with the bottom land 720a.

Furthermore, if a shape of the tooth flanks (first tooth flank 731b, second tooth flank 732b) in the vicinity of the connection points P2, P4 with the bottom land 720a is curved with an upward convex, the stress would easily concentrate onto the vicinity of the connection points P2, P4. In the present embodiment, therefore, the tooth flanks (first tooth flank 731b, second tooth flank 732b) are shaped in curves in which crossing angles θ1, θ2 (gradients) about the bottom land 720a decrease toward the connection points P2, P4 with the bottom land 720a. In other words, the tooth flanks (first tooth flank 731b, second tooth flank 732b) are shaped in a curve with a downward convex (inner radius side). Accordingly, the stress concentration to the vicinity of the connection points P2, P4 can be mitigated.

In addition, as illustrated in FIG. 5, the tooth portion 73 according to the present embodiment is designed to make the pressure angle θ731 of the first tooth face 731a and the pressure angle θ732 of the second tooth face 732a equal. The pressure angle of the first tooth face 731a is a crossing angle between the radius line Lc of the large-diameter gear 71 and a tangent line of the first tooth face 731a. The pressure angle of the second tooth face 732a is a crossing angle between the radius line Lc of the large-diameter gear 71 and a tangent line of the second tooth face 732a.

The pressure angle is one of important parameters in a gear design and needs to be adjusted precisely on the basis of various elements (materials, measurements). Therefore, design workload would increase if the pressure angles of the first tooth face 731a and the second tooth face 732a are designed to be different. In the present embodiment, the designing workload can be reduced because the pressure angle θ731 of the first tooth face 731a and the pressure angle θ732 of the second tooth face 732a are designed to be equal. If the pressure angles were made different between the left side tooth face and the right side tooth face, verification of engagement on each of the left and right tooth faces would be required, which necessitates workload for designing another gear. Designing workload would therefore increase. It is possible to reduce the designing workload by making the pressure angles equal between left and right tooth faces.

Here, a space between adjacent two tooth portions 73, 73 will be limited when the pressure angle θ731 of the first tooth face 731a and the pressure angle θ732 of the second tooth face 732a are made equal. Therefore, in the present embodiment, by differentiating the radiuses of curvature r1, r2 of two tooth flanks (first tooth flank 731b, second tooth flank 732b) adjacent across bottom land 720a, it is made possible to suppress an increase of size of the large-diameter gear 71 (gear).

Between two tooth flanks (first tooth flank 731b, second tooth flank 732b), the radius of curvature r1 of the first tooth flank 731b which is of the drive side is greater than the radius of curvature r2 of the second tooth flank 732b which is of the coast side (r1>r2). In the tooth portion 73 of the counter gear 7, rotation driving force of the engine 2 is input to the first side surface 731 (first tooth face 731a, first tooth flank 731b) which is of the drive side while the vehicle V equipped with the continuous variable transmission 1 is running forward with the rotational driving force of the engine 2. And rotational driving force from the drive wheels 9, 9 is input to the second side surface 732 (second tooth face 732a, second tooth flank 732b) which is of the coast side while the vehicle V equipped with the continuous variable transmission 1 is running a coast running.

In the present embodiment, durability of the tooth portion 73 for forward running is enhanced with higher priority than that for coast running by making the radius of curvature r1 of the first tooth flank 731b greater than the radius of curvature r2 of the second tooth flank 732b.

Also for the tooth portion 58 of the output gear 57 with which the large-diameter gear 71 of the counter gear 7 meshes, it is preferable to make the radius of curvature of the first tooth flank 581b of the first side surface 581 which is of the drive side greater than the radius of curvature of the second tooth flank 582b of the second side surface 582 which is of the coast side (see FIG. 3). In that case, durability against the power transmission during the forward running of the vehicle V can be improved for both of the first side surface 731 of the tooth portion 73 of the large-diameter gear 71 and the first side surface 581 of the tooth portion 58 of the output gear 57.

For the tooth portion 58 of the output gear 57, the radius of curvature of the first tooth flank 581b of the first side surface 581 which is of the drive side may be greater than the radius of curvature of the second tooth flank 582b of the second side surface 582 which is of coast side. In that case, enhanced durability of tooth portion at the meshing point of the pair of gears (large-diameter gear 71 and output gear 57) involved in the power transmission for both of drive running and coast running can be expected.

Figure 10:
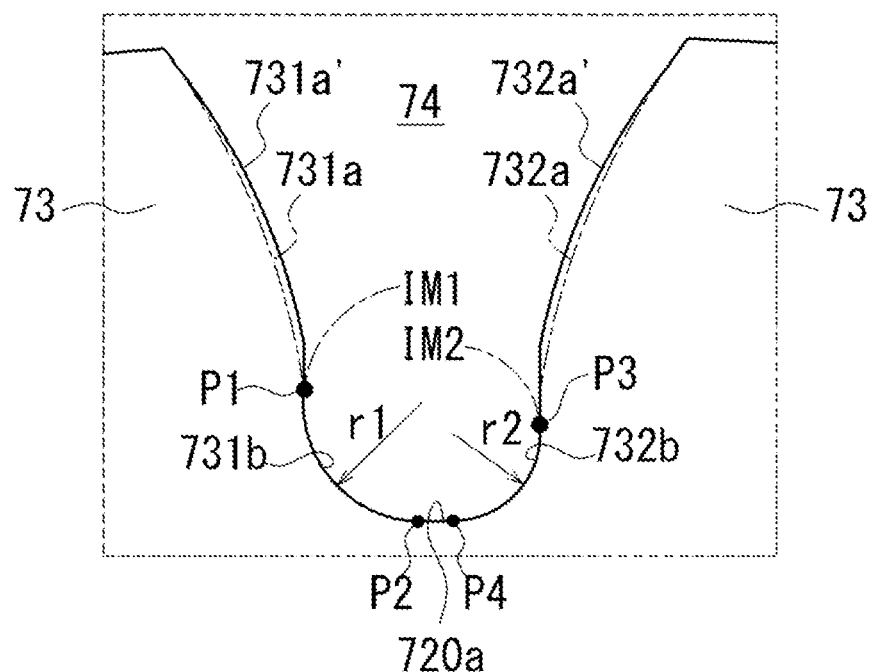
FIG. 10 is a drawing for explaining a process of forming the first side surface 731 and the second side surface 732 of the tooth portion 73.
Figure 11:
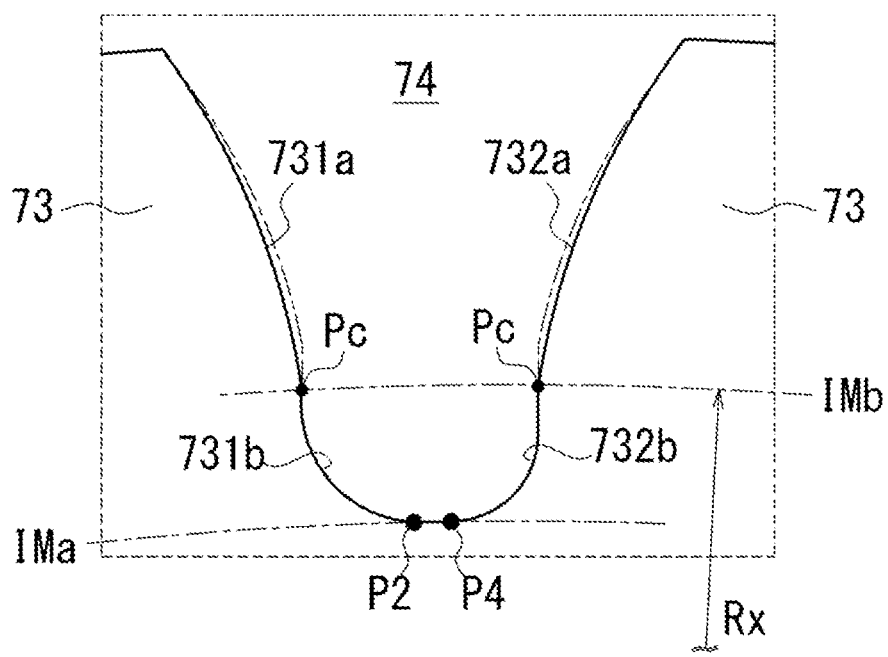
FIG. 11 is a drawing for explaining a process of forming the first side surface 731 and the second side surface 732 of the tooth portion 73.

FIG. 10 and FIG. 11 are drawings explaining a formation process of the first side surface 731 and the second side surface 732 of the tooth portion 73. FIG. 10 illustrates a condition where the first temporal tooth face 731a' and the second temporal tooth face 732a' are left on the first side surface 731 and the second side surface 732. FIG. 11 illustrates a condition where the first temporal tooth face 731a' and the second temporal tooth face 732a' are removed by cutting.

The manufacturing process of the counter gear 7 includes a step of producing an intermediate product having a basic shape of the counter gear 7 through forging of material metals such as carbon steel. The intermediate product has a disc-shaped area which finally becomes the large-diameter gear 71 or the small-diameter gear 75. The large-diameter gear 71 having the tooth portions 73 on its outer periphery and the small-diameter gear 75 having the tooth portions on its outer periphery are formed by cutting the outer periphery of the disc shaped area of the intermediate product by use of a cutting tool.

The shape of the tooth portions 73 of the large-diameter gear 71 of the present embodiment is formed by making the parts other than the tooth faces (first tooth faces 731a, second tooth faces 732a) according to the designed shape, followed by finishing the shapes of the tooth faces (first tooth faces 731a, second tooth faces 732a).

In particular, as illustrated in FIG. 10, the first tooth flank 731b of the first side surface 731 and the second tooth flank 732b of the second side surface 732 are formed by cutting process on the basis of the designed shape. At this status, the first tooth flank 731b is formed with the radius of curvature r1 and the second tooth flank 732b is formed with the radius of curvature r2. Further, an arc-shaped bottom land 720a having its top oriented to the outer radius is formed between the first tooth flank 731b and the second tooth flank 732b.

A temporal tooth face (first temporal tooth face 731a' and second temporal tooth face 732a') inflating toward the tooth space 74 side than the tooth face (first tooth face 731a and second tooth face 732a), which is finally to be formed, is formed. By shaving off the surfaces of the first temporal tooth face 731a' and the second temporal tooth face 732a' with a cutting tool, the tooth face (first tooth face 731a and second tooth face 732a) are formed (see FIG. 11).

In the present embodiment, for cutting the first temporal tooth face 731a' and the second temporal tooth face 732a', the shapes of the first temporal tooth face 731a' and the second temporal tooth face 732a' and the cutting condition are determined such that the positions of cutting start points Pc, Pc on the inner radius side fulfills the following condition:

When the first temporal tooth face 731a' and the second temporal tooth face 732a' are cut, cutting start positions (scoop creation position) on the surface align on a virtual circle IMb. The virtual circle IMb is a virtual circle centered around the rotational axis X3 of the counter gear 7.

In other words, the distance from the shaft center (rotational axis X3) of the counter gear 7 to the cutting start point Pc at the side of the first temporal tooth face 731a', or scoop creation diameter Rx, and the distance from the shaft center (rotational axis X3) of the counter gear 7 to the cutting start point Pc at the side of the second temporal tooth face 732a', or scoop creation diameter Rx, are made equal. Here, the scoop creation position means the most prominent portion of the temporal tooth faces (first temporal tooth face 731a', second temporal tooth face 732a').

This arrangement is for making the contact area between tooth faces when the first side surface 731 of the tooth portion 73 meshes with the first side surface 581 of the tooth portion 58 (see FIG. 3) and the contact area between tooth faces when the second side surface 732 of the tooth portion 73 meshes with the second side surface 582 of the tooth portion 58 substantially same. According to this, a stable engagement between the tooth portion 73 and the tooth portion 58 is achieved and a quality of gear (tooth face precision) is improved.

As described above, in the manufacturing method of the counter gear 7 according to the present embodiment, after forming the bottom land 720a, the first tooth flank 731b, the second tooth flank 732b, the first temporal tooth face 731a' and the second temporal tooth face 732a', following two steps are carried out:

Step of forming the first tooth face 731a by processing the first temporal tooth face 731a'

Step of forming the second tooth face 732a by processing the second temporal tooth face 732a'

A quality of gear (tooth face precision) can be improved by creating the parts other than the tooth faces (first tooth face 731a, second tooth face 732a) according to the designed shape and then finishing the tooth faces (first tooth face 731a, second tooth face 732a).

Figure 12:
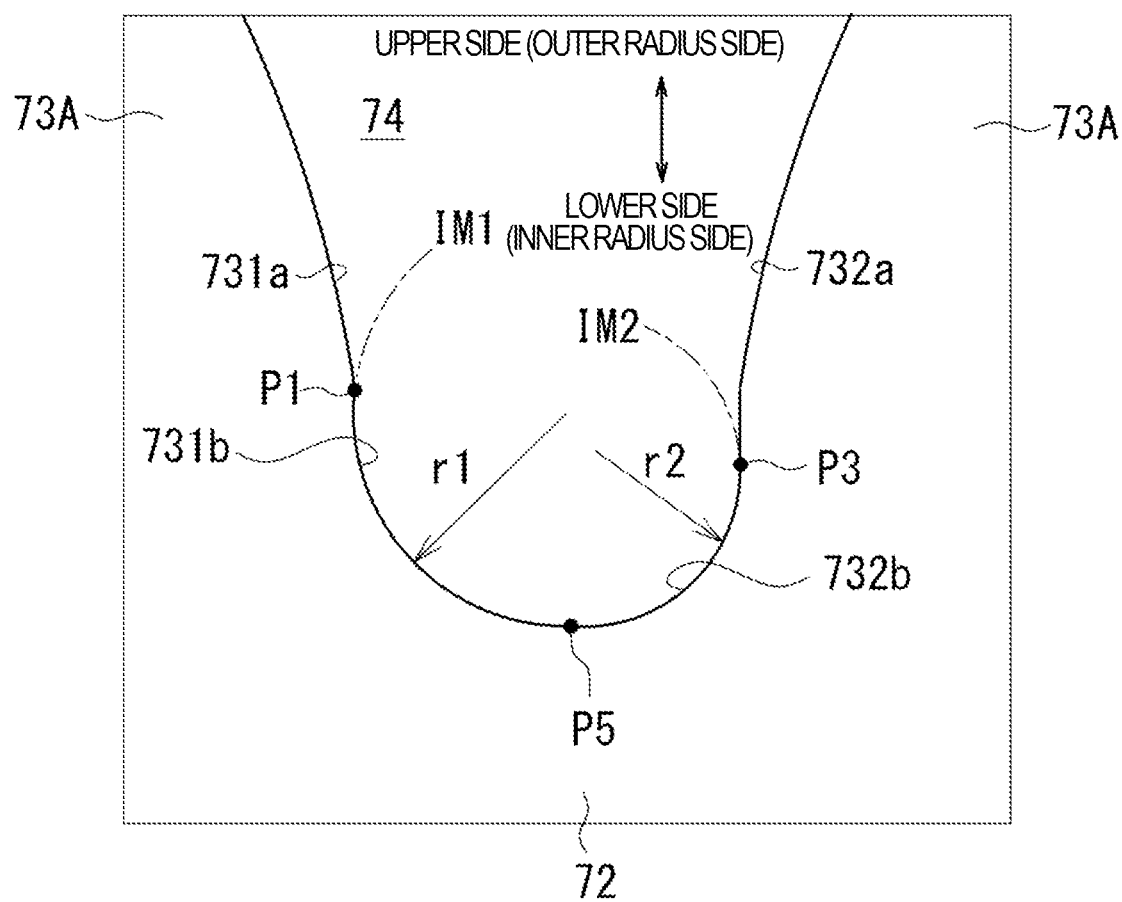
FIG. 12 is a drawing for explaining the shape around the tooth flank according to a modification example.

FIG. 12 is a drawing for explaining a modification example. The aforementioned embodiment described an example in which the bottom land 720a with its top oriented to the outer radius side exists between the first tooth flank 731b and the second tooth flank 732b of the tooth portions 73, 73 adjacent in the circumferential direction (see FIG. 6). Depending on variations such as runout of forming the first tooth flak 731b and the second tooth flank 732b through cutting, a situation may arise where no bottom land 720a is left. Even in such case, a stress concentration around the tooth flanks can be mitigated if the shape forms no edge E at the connection point P5 between the first tooth flank 731b and the second tooth flank 732b. As such, the tooth portion 73A having the tooth flanks (first tooth flank 731b and second tooth flank 732b) of the shape shown in FIG. 12 is also within the scope of the present invention.

As described above, the final reduction mechanism 6 (gear mechanism) according to the present embodiment has following configuration:

(1) The mechanism comprises a large-diameter gear 71 (gear) having tooth portions 73 each including a bottom land 720a;

a first tooth flank 731b connected to the bottom land 720a;

a second tooth flank 732b connected to the bottom land 720a;

a first tooth face 731a connected to the first tooth flank 731b; and a second tooth face 732a connected to the second tooth flank 732b.

The bottom land 720a is curved.

A radius of curvature r1 of the first tooth flank 731b is greater than a radius of curvature r2 of the second tooth flank 732b (r1>r2).

Parts of the first tooth flank 731b and the second tooth flank 732b connected to connection points P2, P4 with the bottom land 720a are curved such that a distance L1, L2 of each of the parts from a shaft center (rotational axis X3) of the large-diameter gear 71 decreases toward the connection points P2, P4 and that a gradient (crossing angle θ1, θ2 with the bottom land 720a) of each of the parts decreases toward the connection points P2, P4.

According to this configuration, following a theory below, it will be possible to provide a gear having a shape balanced with respect to the required functions, including a viewpoint of strength improvement, for the gear.

(A) A stress concentration to the region between the first tooth flank 731b and the second tooth flank 732b is mitigated by reserving the bottom land 720a between the first tooth flank 731b and the second tooth flank 732b. It should be noted that the shape having an edge E between the first tooth flank 731b and the second tooth flank 732b (see FIGS. 7, 8, 9) is in the state where the bottom land no longer exists, substantially meaning no bottom land.

(B) The bottom land 720a is curved to mitigate the stress concentration to the bottom land 720a. It should be noted that the shape of bottom land with edge E is non-curved.

(C) There is a possibility where no bottom land 720a remains if the radius of curvature of both of the first tooth flank 731b and the second tooth flank 732b are increased. On the other hand, it may be an idea to enlarge the large-diameter gear 71 (gear) for enabling the bottom land 720a to remain; however, in that case, it would become an obstacle for downsizing of a gear. By differentiating the radius of curvature of the two of the tooth flanks (first tooth flank 731b and second tooth flank 732b), it is possible to design a gear taking into account a balance of mitigation of stress concentration to the tooth flanks, remained bottom land, and gear downsizing. This is a gear design standing on a finding that function requirements for the first tooth flank 731b and the second tooth flank 732b are not necessarily equivalent.

(D) If the gear has a shape scooped in inner radius direction in the vicinity of the connection points P2, P4 between the tooth flank (first tooth flank 731b and second tooth flank 732b) and the bottom land (bottom land 720a), the stress concentration is easily caused onto the vicinity of the connection points P2, P4. Therefore, the gear is designed such that the distance L1, L2 from the shaft center (rotational axis X3) decreases toward the connection points P2, P4 with the bottom land (bottom land 720a). According to this, it can be avoided to cause a scooped shape in inner radius direction at the vicinity of the connection points between the tooth flank and the bottom land such as the one disclosed in FIG. 3 of JP H08-105513A.

(E) If a shape of a part of the tooth flank at the vicinity of the connection points between the tooth flank (first tooth flank 731b and second tooth flank 732b) and the bottom land (bottom land 720a) is curved with an upward convex, the stress concentration is easily caused onto the vicinity of the connection points (see FIGS. 7 and 8). It is possible to mitigate the stress concentration to the vicinity of the connection points by shaping a curve with gradients decreasing toward the connection points with the bottom land, in other words, a curve with downward convex. According to this, the tooth flank and the bottom land are shaped to draw a continuous R, which makes it possible to suitably prevent to form a sharp edge E.

The final reduction mechanism 6 (gear mechanism) according to the present embodiment has following configuration:

(2) The bottom land 720a is curved to protrude toward an outer radius side of the large-diameter gear 71.

It may be allowed to design the bottom land to be curved with downward convex having its peak at lower side. However, if it is designed to have a curve with a downward convex, there sometimes arises a situation where a bottom land at the side of the first tooth flank 731b and another bottom land at the side of the second tooth flank 732b are scooped too much due to a manufacturing variation and conflict with each other to form an edge E on the bottom land, resulting in a non-curved bottom land. Therefore, it will be possible to suppress an edge formation on the bottom land due to excessive scooping by designing such that the bottom land 720a curved with an upward convex having its peak at upper side remains.

The final reduction mechanism 6 (gear mechanism) according to the present embodiment has following configuration:

(3) It is designed such that the pressure angle θ731 of the first tooth face 731a (see FIG. 5) and the pressure angle θ732 of the second tooth face 732a (see FIG. 5) are equal.

The pressure angle is one of important parameters in gear design and needs to be adjusted precisely on the basis of various elements (materials, measurements). Therefore, design workload would increase if the pressure angle of the first tooth face 731a and the pressure angle of the second tooth face 732a are designed to be different. It is possible to reduce the designing workload by making the pressure angle of the first tooth face 731a and the pressure angle of the second tooth face 732a equal.

If the pressure angle of the first tooth face and the pressure angle of the second tooth face are made equal, the space between adjacent two tooth portions 73, 73 will be limited; therefore, it is an important concept to suppress upsizing of a gear by differentiating the radius of curvature of the two tooth flanks.

The final reduction mechanism 6 (gear mechanism) according to the present embodiment has following configuration:

(4) The final reduction mechanism 6 (gear mechanism) comprises the counter gear 7 and the output gear 57 (a pair of gears). The counter gear 7 and the output gear 57 are assembled so as to contact the first tooth face 731a of the tooth portion 73 of the counter gear 7 with the first tooth face 581a of the tooth portion 58 of the output gear 57. In the tooth portion 73, the radius of curvature r1 of the first tooth flank 731b is greater than the radius of curvature r2 of the second tooth flank 732b. In the tooth portion 58, the radius of curvature of the first tooth flank 581b is greater than the radius of curvature of the second tooth flank 582b.

In the situation where the radiuses of curvature of the first tooth flank 731b and second tooth flank 732b of tooth portion 73 of the counter gear 7 are different while the radiuses of curvature of the first tooth flank 581b and the second tooth flank 582b of tooth portion 58 of the output gear 57 are different, one idea is to assemble the counter gear 7 and the output gear 57 (a pair of gears) in orientations to contact the tooth face at the side of the tooth flank with the greater radius of curvature and the tooth face at the side of the tooth flank with the smaller radius of curvature. In such a case, stress tolerance of the tooth portion can be improved averagely for both of forward rotation (the rotation during forward running) and reverse rotation (the rotation during backward running) of the counter gear 7. However, it is preferable to adopt the assembly as mentioned above because it is usual that there is a huge gap of load between the forward rotation and the reverse rotation. This way of assembly can be called a method taking into account the balance of mitigation of stress concentration to tooth flanks, bottom land reserving and gear downsizing.

The manufacturing method of the final reduction mechanism 6 (gear mechanism) according to the present embodiment has following configuration:

(5) The final reduction mechanism 6 comprises:

A large-diameter gear 71 (gear) having tooth portions each including:
  a bottom land 720a;
  a first tooth flank 731b connected to the bottom land 720a;
  a second tooth flank 732b connected to the bottom land 720a;
  a first tooth face 731a connected to the first tooth flank 731b; and
  a second tooth face 732a connected to the second tooth flank 732b.

The bottom land 720a is curved.

A radius of curvature r1 of the first tooth flank 731b is greater than a radius of curvature r2 of the second tooth flank 732b.

Parts of the first tooth flank 731b and the second tooth flank 732b connected to connection points P2, P4 with the bottom land 720a are curved such that a distance L1, L2 of each of the parts from a shaft center of the large-diameter gear 71 decreases toward the connection points P2, P4 and that a gradient (crossing angle θ1, θ2 with the bottom land 720a) of each of the parts decreases toward the connection points P2, P4.

In the manufacturing method, after forming the bottom land 720a, the first tooth flank 731b, the second tooth flank 732b, the first temporal tooth face 731a' and the second temporal tooth face 732a', following two steps are carried out:

Step of forming the first tooth face 731a by processing the first temporal tooth face 731a'
Step of forming the second tooth face 732a by processing the second temporal tooth face 732a'

A quality of gear (tooth face precision) can be improved by creating the parts other than the tooth faces (first tooth face 731a, second tooth face 732a) according to the designed shape and then finishing the tooth faces.

The large-diameter gear 71 manufactured by the manufacturing method of the final reduction mechanism 6 (gear mechanism) according to the present embodiment has following configuration:

(6) The large-diameter gear is designed such that the pressure angle θ731 of the first tooth face 731a and the pressure angle θ732 of the second tooth face 732a are equal.

A pressure angle is one of important parameters in a gear design and needs to be adjusted precisely on the basis of various elements (materials, measurements). Therefore, design workload would increase if the pressure angles of the first tooth face and the second tooth face are designed to be different. Therefore, the design workload can be reduced by designing the pressure angle of the first tooth face and the pressure angle of the second tooth face to be equal. And, when the pressure angle of the first tooth face and the pressure angle of the second tooth face are made equal, a space between adjacent two teeth is limited. Thus, differentiating the radiuses of curvature of the two tooth flanks is a critical idea to suppress the upsizing of a gear.

The method of manufacturing the final reduction mechanism 6 (gear mechanism) according to the present embodiment comprises following configuration:

(7) The first temporal tooth face 731a' and the second temporal tooth face 732a' are formed such that the scoop creation diameter Rx of the first temporal tooth face 731a' and the scoop creation diameter Rx of the second temporal tooth face 732a' are made uniform.

The contact area of the tooth faces when the first side surface 731 of the tooth portion 73 engages with the first side surface 581 of the tooth portion 58 and the contact area of the tooth faces when the second side surface 732 of the tooth portion 73 engages with the second side surface 582 of the tooth portion 58 are substantially same. Accordingly, the engagement of the tooth portion 73 and the tooth portion 58 becomes stable, and thus the quality of gear (tooth face precision) is improved.

Making the scoop creation diameter Rx of the first temporal tooth face 731a' and the scoop creation diameter Rx of the second temporal tooth face 732a' uniform can be put into other words as below:

The heights of the scoop creation positions at the side of larger radius of curvature and at the side of the smaller radius of curvature are aligned in an intermediate product after cutting the temporal tooth faces 731a', 732a' (after teeth cutting)

When machining the tooth faces in the latter process (gear shaving, gear honing, etc.), the diameter at which meshing with the tool starts is aligned.

The meshing between the tooth faces (first tooth face 731a, second tooth face 732a) of the tooth portions 73 becomes stable, and thus the quality of gear (tooth face precision) can be improved.

In the above-described embodiment, the counter gear 7 is a helical gear, and the shapes of the tooth portions of the helical gears meshing with each other are described as an example. The present invention can be applied to other gears such as spur gears.

In the above-described embodiment, a pair of gears is a parallel gear pair in which the external gears of the helical gears meshing with each other is described as one example. Furthermore, a shape of a tooth portion means a line shape drawn by a surface (surface of tooth face, surface of tooth flank, surface or bottom land, etc.) of a gear in a cross-section viewed from an axial direction of the gear. The end face of the gear becomes same shape with the cross section in some cases.

The present invention is an invention created by pursuing a realistic solution in a formation by cutting. The shape formed by cutting is the shape (tooth shape) based on tooth shape creation theory. The scope of application of the present invention is not limited to cutting but can be applied to formation by other methods such as forging.

In the above-described embodiment, the case of a pair of gears located on the transmission path of the rotational power of the engine 2 has been mentioned as example. The present invention may be applied to a hybrid vehicle equipped with both an engine 2 and a motor (not shown) or a pair of gears located on a power transmission system path of the motor vehicle.

Although the embodiment of the present invention has been described as above, the present invention is not limited to the modes of the embodiment. The embodiments can be modified, if appropriate, within a technical idea of the invention.

With respect to the above description, the contents of application No. 2020-142351, with a filing date of Aug. 26, 2020 in Japan, are incorporated herein by reference.

What is claimed is:

1. A method for manufacturing a gear mechanism, the gear mechanism comprising a gear shaped to have:
    a bottom land;
    a first tooth flank connected to the bottom land;
    a second tooth flank connected to the bottom land;
    a first tooth face connected to the first tooth flank; and
    a second tooth face connected to the second tooth flank,
    wherein the bottom land is curved,
        a radius of curvature of the first tooth flank is greater than a radius of curvature of the second tooth flank, and
        parts of the first tooth flank and the second tooth flank connected to connection points with the bottom land are curved such that a distance of each of the parts from a shaft center of the gear decreases toward the connection points and that a gradient of each of the parts decreases toward the connection points,
    the method comprising:
        forming the bottom land, the first tooth flank, the second tooth flank, a first temporal tooth face and a second temporal tooth face; and
        carrying out a step of forming the first tooth face by processing the first temporal tooth face and a step of forming the second tooth face by processing the second temporal tooth face, wherein
        the first temporal tooth face and the second temporal tooth face are cut such that a distance from the shaft center of the gear to a cutting start point at a side of the first temporal tooth face and a distance from the shaft center of the gear to a cutting start point at a side of the second temporal tooth face are equal.

2. The method for manufacturing the gear mechanism according to claim 1, wherein
    the gear mechanism is designed such that a pressure angle of the first tooth face and a pressure angle of the second tooth face are equal.

* * * * *